United States Patent [19]

Breitenfellner et al.

[11] 4,148,956

[45] Apr. 10, 1979

[54] THERMOPLASTIC MOULDING COMPOSITION AND ITS USE AND SHEETS MADE FROM THE MOULDING COMPOSITION

[75] Inventors: Franz Breitenfellner, Bensheim; Roland Fink, Pullach, both of Fed. Rep. of Germany

[73] Assignees: Alkor GmbH, Munich, Fed. Rep. of Germany; Ciba-Geigy AG, Basel, Switzerland

[21] Appl. No.: 863,547

[22] Filed: Dec. 22, 1977

[30] Foreign Application Priority Data

Dec. 31, 1976 [CH] Switzerland ................. 16504/76

[51] Int. Cl.$^2$ .............................................. C08L 67/06
[52] U.S. Cl. ................................ 428/156; 260/40 R; 260/873; 260/881
[58] Field of Search .............. 260/873, 40 R; 428/156

[56] References Cited

U.S. PATENT DOCUMENTS

| 3,644,574 | 2/1972 | Jackson | 260/873 |
| 4,016,221 | 4/1977 | Kudo | 260/873 |

FOREIGN PATENT DOCUMENTS

| 2357406 | 3/1974 | Fed. Rep. of Germany. | |
| 2364318 | 7/1974 | Fed. Rep. of Germany. | |
| 2448596 | 4/1975 | Fed. Rep. of Germany | 260/873 |
| 2359060 | 5/1975 | Fed. Rep. of Germany. | |
| 2523010 | 11/1975 | Fed. Rep. of Germany | 260/873 |
| 50-23448 | 3/1975 | Japan | 260/873 |

OTHER PUBLICATIONS

H. Jenne, Styrol–Polymere, Kunststoffe Bd. 62, 1972, H 10, pp. 616–625.

*Primary Examiner*—Paul Lieberman
*Attorney, Agent, or Firm*—Luther A. R. Hall

[57] ABSTRACT

Thermoplastic moulding compositions of linear polyesters and styrene/acrylonitrile modified by α-methylstyrene and/or acrylates can readily be processed to give mouldings which have outstanding toughness characteristics and other mechanical properties. Furthermore, from these moulding compositions it is possible to produce sheets which can be hot-laminated without patterns applied thereto being destroyed.

22 Claims, No Drawings

THERMOPLASTIC MOULDING COMPOSITION AND ITS USE AND SHEETS MADE FROM THE MOULDING COMPOSITION

The present invention relates to a thermoplastic moulding composition of a linear thermoplastic polyester or mixtures of these polyesters and a styrene copolymer and also, if desired, customary additives, the use of this moulding composition for the production of mouldings, and sheets made of this moulding composition.

Thermoplastic polyesters, for example polyethylene terephthalate and polybutylene terephthalate, are moulding compositions from which mouldings having valuable mechanical properties can be produced. For various applications it is now desirable to modify or to improve the properties and for this purpose various additives can be incorporated.

Thus, in German Offenlegungsschriften Nos. 2,035,390, 2,357,406 and 2,364,318, modifying agents for poly-1,4-butylene terephthalate are proposed which essentially are intended to improve the toughness characteristics. These agents consist of polymers or copolymers with monomers, for example styrene, monoolefins, butadiene, acrylates or methacrylates or acrylonitrile. In German Offenlegungsschrift No. 2,035,390 it is indeed mentioned that copolymers of, for example, 3 monomers can also be used. However, it is not mentioned that a very specific copolymer, based on styrene and acrylonitrile, when mixed with thermoplastic polyesters imparts to the moulding composition, over a broad mixing range, characteristics which in some cases are constant and improved compared with those of polyester moulding compositions which contain polystyrene or other polystyrene copolymers. In the case of the last-mentioned moulding compositions, the impact strength found is in general only inadequate and frequently even decreases as the content of styrene polymer increases, and frequently greater embrittlement of the mixed moulding composition is observed than would be expected from the individual constituents.

There is, furthermore, a need for sheets of thermoplastic material which can be embossed and then applied, by means of hot-laminating processes and known adhesives, to other material, for example wood. Sheets of this type, which in general are used as a substitute veneer, have been disclosed in German Offenlegungsschrift No. 2,359,060. A disadvantage of these sheets is, in particular, that because of their characteristics they are not very suitable for hot-laminating processes. Embossed PVC sheets, for example, are also in use to date. However, their heat distortion resistance is inadequate, so that the embossed image is destroyed under the pressures required for hot-laminating. Papers impregnated with thermosetting resins can be only poorly embossed and are frequently too brittle for processing by the hot-laminating process.

The object of the present invention is to provide a thermoplastic mixed moulding composition which has high toughness characteristics and good mechanical properties, especially rigidity and heat distortion resistance. A further object of the present invention is to enable sheets and panels to be formed from these moulding compositions, which sheets and panels can be embossed and can be hot-laminated by means of known equipment whilst retaining an embossed image which has been applied and, in this process, can be bonded to the other material by means of conventional adhesives based on modified vinyl resins.

One subject of the present invention is a thermoplastic moulding composition containing a linear thermoplastic polyester or mixtures of these polyesters and a styrene copolymer and also, if desired, customary additives, wherein the moulding composition contains styrene/acrylonitrile modified with α-methylstyrene and/or acrylates.

In general, the moulding composition according to the invention contains 5 to 95, preferably 10 to 90, especially 50 to 95 and in particular 50 to 80, % by weight of modified styrene/acrylonitrile and 95 to 5, preferably 90 to 10, especially 50 to 5 and in particular 50 to 20, % by weight of polyester.

A multiplicity of linear thermoplastic polyesters are suitable for the moulding compositions according to the invention. They are preferably crystalline or partially crystalline and in this case have, in particular, melting points of at least 150° C. However, they can also be in an amorphous form and the polyester then preferably has a glass transition temperature of at least 100° C. and especially of at least 130° C. The intrinsic viscosity of the polyesters is preferably at least 0.6 dl/g and in particular at least 0.8 dl/g.

The polyesters can be homopolyesters or copolyesters which are synthesised from aliphatic, cycloaliphatic or aromatic dicarboxylic acids, diols or hydroxycarboxylic acids. Mixtures of these polyesters are also suitable. Their composition depends essentially on the properties desired for a specific application.

The aliphatic dicarboxylic acids can contain 2 to 40 C atoms, the cycloaliphatic dicarboxylic acids can contain 6 to 10 C atoms, the aromatic dicarboxylic can contain 8 to 14 C atoms, the aliphatic hydroxycarboxylic acid can contain 2 to 12 C atoms and the aromatic and cycloaliphatic hydroxycarboxylic acids can contain 7 to 14 C atoms.

The aliphatic diols can contain 2 to 12 C atoms, the cycloaliphatic diols can contain 5 to 8 C atoms and the aromatic diols can contain 6 to 16 C atoms.

Those diols in which two hydroxyl groups are bonded to hydrocarbon radicals of aromatic character are termed aromatic diols.

Furthermore, it is possible for the polyesters to be branched by small amounts, for example 0.1 to 3 mol %, of monomers having more than two functional groups (for example pentaerythritol or trimellitic acid).

In the case of polyesters of at least 3 monomers, these monomers can be statistically distributed, or the polyesters can be block polymers. Copolymers of polycarbonates and polyesters are also termed polyesters in this context.

Suitable dicarboxylic acids are linear and branched saturated aliphatic dicarboxylic acids, aromatic dicarboxylic acids and cycloaliphatic dicarboxylic acids.

Aliphatic dicarboxylic acids which can be used are those having 2–40 C atoms, for example oxalic acid, malonic acid, dimethylmalonic acid, succinic acid, octadecylsuccinic acid, pimelic acid, adipic acid, trimethyladipic acid, sebacic acid, azelaic acid and dimeric acids (dimerisation products of unsaturated aliphatic carboxylic acids such as oleic acid) and alkylated malonic and succinic acids, such as octadecylsuccinic acid.

Cycloaliphatic dicarboxylic acids which can be used are: 1,3-cyclobutanedicarboxylic acid, 1,3-cyclopentanedicarboxylic acid, 1,3- and 1,4-cyclohexanedicarboxylic acid, 1,3- and 1,4-dicarboxymethylcyclohexane and 4,4′-dicyclohexyldicarboxylic acid.

Suitable aromatic dicarboxylic acids which can be used are: in particular terephthalic acid, isophthalic acid and o-phthalic acid and also 1,3-, 1,4-, 2,6- or 2,7-naphthalenedicarboxylic acid, 4,4′-diphenyldicarboxylic acid, 4,4′-diphenylsulphone-dicarboxylic acid, 1,1,3-trimethyl-5-carboxy-3-(p-carboxyphenyl)-indane, diphenyl ether 4,4′-dicarboxylic acid and bis-p-(carboxyphenyl)-methane.

The aromatic dicarboxylic acids are preferred and amongst these terephthalic acid, isophthalic acid and orthophthalic acid are particularly preferred.

Further suitable dicarboxylic acids are those which contain —CO—NH— groups; they are described in German Offenlegungsschrift No. 2,414,349. Dicarboxylic acids which contain N-heterocyclic rings are also suitable, for example those which are derived from carboxyalkylated, carboxyphenylated or carboxybenzylated monoamino-s-triazinedicarboxylic acids (c.f. German Offenlegungsschriften Nos. 2,121,184 and 2,533,675), mono- or bis-hydantoins, unsubstituted or halogenated benzimidazolones or parabanic acid. In these acids, the carboxyalkyl group can contain 3 to 20 C atoms.

Suitable aliphatic diols are the linear and branched aliphatic glycols, especially those having 2 to 12, and especially 2–6, carbon atoms in the molecule, for example: ethylene glycol, 1,2- or 1,3-propylene glycol, 1,2-, 1,3-, 2,3- or 1,4-butanediol, pentylglycol, neopentylglycol, 1,6-hexanediol and 1,12-dodecanediol. A suitable cycloaliphatic diol is, for example, 1,4-dihydroxycyclohexane. Further suitable aliphatic diols are, for example, 1,4-dihydroxymethylcyclohexane, aromatic-aliphatic diols, such as p-xylylene glycol or 2,5-dichloro-p-xylylene glycol, 2,2-($\beta$-hydroxyethoxyphenyl)-propane and also polyalkylene glycols, such as diethylene glycol, triethylene glycol or polyethylene glycol. The alkylene diols are preferably linear and contain, in particular, 2 to 4 carbon atoms.

Preferred diols are the alkylene diols, 1,4-dihydroxycyclohexane and 1,4-dihydroxymethylcyclohexane. Ethylene glycol and 1,4-butanediol are particularly preferred.

Further suitable diols are the $\beta$-hydroxyalkylated, and especially $\beta$-hydroxyethylated, bisphenols, such as 2,2-bis-[4′-($\beta$-hydroxyethoxy)-phenyl]-propane. Further bisphenols are mentioned below.

A further group of aliphatic diols comprises those of the general formula I

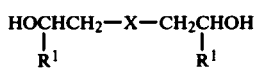
(I)

in which $R^1$ is methyl and preferably a hydrogen atom and X is a radical of the formulae

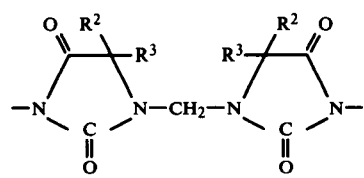

-continued

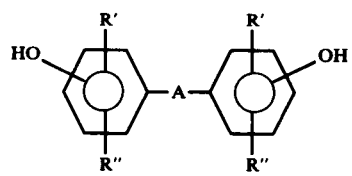

in which $R^2$, $R^3$ and $R^4$ independently of one another are alkyl having 1 to 4 C atoms, or $R^2$ and $R^3$, or the $R^4$'s, together are tetramethylene or pentamethylene, and the $R^5$'s independently of one another are a hydrogen, chlorine or bromine atom.

These diols are known and are described, for example, in German Offenlegungsschriften Nos. 1,812,003, 2,342,432, 2,342,372 and 2,453,326. Examples are: N,N′-bis-($\beta$-hydroxyethyl-5,5-dimethyl)-hydantoin, N,N′-bis-($\beta$-hydroxypropyl-5,5-dimethyl)-hydantoin, methylene-bis-[N,N′-($\beta$-hydroxyethyl)-5-methyl-5-ethyl-hydantoin], methylene-bis-[N-($\beta$-hydroxyethyl)-5,5-dimethylhydantoin] and N,N′-bis-($\beta$-hydroxyethyl)-benzimidazolone, -(tetrachloro)-benzimidazolone or -(tetrabromo)-benzimidazolone.

Preferably, in formula I, $R^1$ is a hydrogen atom, $R^2$, $R^3$ and $R^4$ are methyl and all of the $R^5$ are either a hydrogen atom, a chlorine atom or a bromine atom.

Aromatic diols which can be used are mononuclear diphenols and especially binuclear diphenols which carry one hydroxyl group on each aromatic nucleus. Aromatic is understood as meaning hydrocarbon aromatic radicals, such as phenylene or naphthylene. In addition to, for example, hydroquinone, the bisphenols which can be represented by the following formula are particularly preferred:

![formula]

The hydroxyl groups can be in the m-position but especially in the p-position. In this formula, R′ and R″ can be alkyl having 1 to 6 C atoms, halogen, such as chlorine or bromine, and especially hydrogen atoms. A can be a direct bond or O, S, SO$_2$ or substituted or unsubstituted alkylidene, cycloalkylidene or alkylene.

Examples of substituted or unsubstituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are: bis-(p-hydroxyphenyl) ether or bis-(p-hydroxyphenyl) thioether, bis-(p-hydroxyphenyl)-sulphone, bis-(p-hydroxyphenyl)-methane, 1,2-bis-(p-hydroxyphenyl)-ethane, 1-phenyl-bis-(p-hydroxyphenyl)-methane, diphenyl-bis-(p-hydroxyphenyl)-methane, 2,2-bis-(4'-hydroxy-3'-dimethylphenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

Suitable polyesters of hydroxycarboxylic acids are, for example, polycaprolactone, polypivalolactone or the polyesters of 4-hydroxycyclohexanecarboxylic acid or 4-hydroxybenzoic acid.

Polyesters with aromatic dicarboxylic acids, and especially the polyalkylene terephthalates, have achieved the greatest importance. Therefore, moulding compositions according to the invention, in which the polyester is synthesised from, relative to the polyester, at least 30 mol % and preferably at least 40 mol % of aromatic dicarboxylic acids and at least 30 mol % and preferably at least 40 mol % of alkylene diols having, preferably, 2 to 12 C atoms, are preferred.

In this case, in particular, the alkylene diol is linear and contains 2–6 C atoms, for example ethylene glycol, trimethylene glycol, tetramethylene glycol or hexamethylene glycol, and the aromatic dicarboxylic acid is terephthalic acid and/or isophthalic acid. Particularly preferentially, the polyester is polyethylene terephthalate and/or poly-1,4-butylene terephthalate.

The moulding compositions according to the invention contain a modified styrene/acrylonitrile polymer. The latter contains 10 to 85% by weight, and preferably 30 to 80% by weight, of styrene, 5 to 40% by weight, and preferably 10 to 30% by weight, of acrylonitrile and 5 to 50% by weight, and preferably 10 to 40% by weight, of acrylates and/or α-methylstyrene.

The average molecular weight of the modified polymer can be 10,000 and above, preferably at least 50,000 and especially at least 80,000. An upper limit of the molecular weight is set by the economics and the production methods.

The modification can be effected by mixing polymers of α-methylstyrene or of an acrylate with SAN. For the moulding compositions according to the invention, however, statistical copolymers of styrene, acrylonitrile, α-methylstyrene and/or acrylates are preferably used. The alcohol radical in the ester group of the acrylate can contain 1 to 6, and preferably 1 to 4, C atoms. SAN modified by graft polymerisation is particularly preferred. These are generally produced by using a polymer of the modifying agent and manufacturing a graft polymer by copolymerisation with styrene and acrylonitrile.

SAN modified by acrylate elastomers is particularly preferred, preferably in the form of graft polymers. The abbreviations for these is ASA polymers and they are available commercially. The acrylate elastomer is usually a copolymer consisting in the main of acrylate with, for example, acrylonitrile, β-chloroethyl vinyl ether, α-olefines or others. However, homopolymers having elastomer characteristics are also known.

The polyesters of the moulding compositions according to the invention are produced by processes known in the art, for example solution condensation or azeotropic condensation, interfacial condensation, melt condensation or solid phase condensation, as well as combinations of these methods, depending on which polyester-forming derivatives and reaction catalysts are used. Catalysts which may be mentioned are amines, inorganic or organic acids, metals, metal compounds and mixtures thereof.

Inert additives of all types, for example fillers such as talc, calcium carbonate, barium sulphate, $SiO_2$, kaolin, micromica, wollastonite and metal powders, and reinforcing fillers, such as glass fibres and glass beads, inorganic or organic pigments, optical brighteners, delustering agents, processing auxiliaries, such as lubricants, mould release agents and agents which promote crystallisation, flameproofing agents, nucleating agents and stabilisers, such as phosphorus-organic compounds, for example triphenyl phosphite, can be added during working up of the polyester melt or even prior to the polycondensation reaction or during mixing of the polyesters with modified styrene/acrylonitrile. The additives can even be added, either on their own or incorporated into the modified SAN, during the production of the moulding compositions according to the invention.

The moulding compositions according to the invention are produced, for example, by regranulating the polyesters, in the form of granules thereof, together with a modified SAN polymer (mixing in the melt phase, discharging and cooling the melt and granulating). The conventional reactors are suitable for this. Advantageously, this production is effected continuously in extruders.

However, it also suffices to use mixtures of the granules of polyester mixtures or their individual constituents with the modified SAN polymers. Particularly advantageously, these granule mixtures are processed direct to mouldings, for example by means of injection moulding and extrusion processes, since the individual constituents are surprisingly readily compatible and miscible.

With the moulding compositions according to the invention, outstanding toughness characteristics are found, surprisingly, over the entire mixing range. Other mechanical properties are also surprisingly good, for example the rigidity and heat distortion resistance. The moulding compositions can be processed without problems and, surprisingly, although they have high softening temperatures, no embrittlement is observed.

The moulding compositions according to the invention can be partially crystalline to amorphous, depending on which individual constituents they contain and the ratios in which these constituents are employed. They are thermoplastic materials from which mouldings having valuable properties can be produced by the conventional shaping processes, such as casting, injection moulding and extruding. Examples of such mouldings are components for technical equipment, apparatus casings, household equipment, sports equipment, components for the electrical and electronics industries and electrical insulations, car components, circuits, fibres and semi-finished products which can be shaped by machining. The use of the materials for coating articles by means of immersion or powder coating processes is also possible, as is their use as hot-melt adhesives. The moulding compositions according to the invention are outstandingly suitable for specific applications of all types since their spectrum of properties can be modified in the desired direction in manifold ways.

The moulding compositions according to the invention are outstandingly suitable for the production of sheets and panels having valuable properties, especially excellent embossability.

A further subject of the present invention is, therefore, a plastic sheet or panel containing a linear thermoplastic polyester or mixtures of these polyesters and a styrene polymer and also, if desired, conventional additives, wherein the sheet or panel contains styrene/acrylonitrile modified with α-methylstyrene and/or acrylates. In other respects, all of the preferences which have also been listed for the moulding composition according to the invention apply. The sheets can contain glass beads for delustering and scratch-resistant finishing, as has been described, for example, in German Offenlegungsschrift No. 2,359,060. The panels, but not the sheets, can also contain reinforcing fillers. The panels and sheets are produced using known processes and equipment, for example by extrusion by means of cooling dies or slot dies or by extrusion-blowing by means of annular dies. The thickness of the sheets can be up to 1 mm and more and there is a continuous transition to the panels, which can be up to several centimeters thick.

The sheets and panels according to the invention are suitable as coating materials for other materials comprising, for example, wood, glass, ceramic, metal or other plastics, and outstanding strengths can be achieved using conventional adhesion promoters, for example based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films.

A preferred field of application for the sheet material according to the invention is the production of veneer materials, for example for the furniture industry and for doors or wall coverings, since, despite the relatively high softening temperatures of the sheets, the surfaces can be provided surprisingly well, even at temperatures of about 150° C., with an embossed pattern which is a complete and faithful reproduction of even the finest peaks and valleys. Embossing of the sheets is effected by the processes commonly known to those skilled in the art; it can withstand surprisingly high loads.

The embossed sheets are particularly suitable for the production of true-to-nature wood imitations. For this purpose, dyes are filled into the grooves of the embossing, for example by means of a doctor blade. Subsequently, the excess is removed and the surface of the sheet is further finished. Embossed papers impregnated with thermosetting resins are not very suitable for this process since the dyes absorb into the material.

A particular advantage is that the sheets according to the invention, in the embossed and the non-embossed form, can be applied to other materials, using known adhesives based on vinyl resins and outstanding strengths are achieved by this means. Since the sheets are thermoplastic and tough, it is also possible to coat pre-shaped articles. The adhesive can be applied beforehand to the sheet or to the other material. However, it is particularly surprising and advantageous that the embossed sheet material according to the invention can be applied to other surfaces, for example of wood, by means of hot-laminating processes. The heat distortion resistance of the embossed sheets is so high that, surprisingly, the embossed pattern remains virtually unchanged at the temperatures and under the pressures required for this process, whereas, for example, the embossed image of papers impregnated with thermosetting resins, which is already poorer, is flattened even further, although these papers have an even higher heat distortion resistance.

The polyesters used in the Examples are characterised in more detail by the following identifying data. The polyesters are characterised by those morphological changes which are measured by means of differential thermoanalysis on a sample which has been heat-treated at 30° C. above the melting point or softening point for 3 minutes and then rapidly chilled. The chilled sample is heated at a heating rate of 16° C./minute by means of a "DSC-1B" differential scanning calorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the turning point at the sudden increase in the specific heat in the thermogram, the crystallization temperature is given as the apex of the exothermic peak and the melting point is given as the apex of the endothermic peak. The relative viscosity of the polycondensation products of the Examples is determined on solutions of 1 g of polyester in 100 ml of a mixture consisting of equal parts of phenol and symmetrical tetrachloroethane, at 30° C. The softening point ($T_s$) is determined on a Kofler heated stage microscope at a heating rate of 15° C./minute, a cross being formed from 2 filaments and the softening point being designated as that temperature at which the sharp angles of the cross disappear. The Examples which follow serve to illustrate the invention in more detail.

EXAMPLE 1

Polybutylene terephthalate (CRASTIN XB 2891, PBT from CIBA-GEIGY AG) is mixed, in the concentrations indicated in Table 1, in each case with a styrene/acrylonitrile copolymer modified, according to the invention, with acrylate elastomers (Luran S 757 R, ASA from BASF AG), a standard polystyrene (Polystyrene 143 E, PS from BASF AG), an acrylonitrile/butadiene/styrene (Terluran, ABS from BASF AG), a styrene/acrylonitrile (Luran 368 R, SAN from BASF AG) and an impact-resistant polystyrene (Vestyron 719, PS from Chemische Werke Huls AG) to give a granule mixture. These granule mixtures are processed to mouldings in an Arburg Allrounder injection moulding machine at barrel temperatures of 250° C. and a mould temperature of 60° C.

The characteristics listed in Table 1 are determined on these mouldings. It can be seen from these characteristics that the polymer blends, according to the invention, consisting of ASA and PBT are distinguished by high toughness over the entire concentration ratios of the components of the mixture and that the Vicat softening point, as a measure of the heat distortion resistance, shows a distinct increase as the proportion of PBT increases. The mixtures also have a high flexural strength and a high modulus of elasticity.

In contrast to this, the mixtures of PBT/standard polystyrene, PBT/impact-resistant polystyrene, PBT/ABS and PBT/SAN have poor toughness characteristics.

Table 1

| Composition | | Impact strength DIN 53,453, 23° C.(cmkp/cm$^2$) | Flexural strength ASTM D 790 23° C. (kp/cm$^2$) | Modulus of Elasticity ASTM D 790, 23° C. (kp/cm$^2$) | Vicat softening point DIN 53,460, process B (5 kp) (° C.) |
|---|---|---|---|---|---|
| ASA | PBT | | | | |
| 100% by weight | 0% by weight | no break | 770 | 25,000 | 104 |
| 75% by weight | 25% by weight | no break | 770 | 25,000 | 106 |
| 50% by weight | 50% by weight | no break | 780 | 25,000 | 113 |
| 25% by weight | 75% by weight | no break | 800 | 25,000 | 131 |
| 0% by weight | 100% by weight | no break | 850 | 25,000 | 170 |
| PS | PBT | | | | |
| 75% by weight | 25% by weight | 3.3 | | | 85 |
| 50% by weight | 50% by weight | 5.8 | | | 92 |
| 25% by weight | 75% by weight | 11.8 | | | 119 |
| impact-resistant PS | PBT | | | | |
| 75% by weight | 25% by weight | 17.8 | | | 85 |
| 50% by weight | 50% by weight | 25.9 | | | 93 |
| 25% by weight | 75% by weight | 40.8 | | | 117 |
| ABS | PBT | | | | |
| 75% by weight | 25% by weight | 16.2 | | | 105 |
| 50% by weight | 50% by weight | 35.2 | | | 113 |
| 25% by weight | 75% by weight | 41.6 | | | 130 |
| SAN | PBT | | | | |
| 75% by weight | 25% by weight | 10.8 | | | 106 |
| 50% by weight | 50% by weight | 15.2 | | | 107 |
| 25% by weight | 75% by weight | no break | | | 126 |

EXAMPLE 2

In the same way as in Example 1, mouldings are produced from granule mixtures of polyethylene terephthalate (CRASTIN E 150, PETP from CIBA-GEIGY AG) and a styrene/acrylonitrile copolymer modified with acrylate elastomers (Luran S 757 R, ASA from BASF AG) by injection moulding, specifically at a barrel temperature of 270° C. and a mould temperature of 60° C. The characteristics listed in Table 2 are determined for these mouldings. In accordance with this survey, these polymer blends are also distinguished, inter alia, by good toughness characteristics.

Embossing is carried out on the conventional roll embossing calenders at sheet temperatures of 170° C. and embossing roll temperatures of 160° C. The surface structure of the embossing roll is reproduced with accurate contours.

This sheet is laminated, using a dispersion of modified vinyl resin (Vinnapas CEF 19 from Messrs. Wacker Chemie GmbH, Burghausen), onto chipboard in a fast-cycling press at a temperature of 120° C. and under a pressure of 8 kp/cm$^2$ in the course of 20 seconds and the whole is removed from the press without cooling. The embossed image is not impaired by these laminating conditions. The chipboard parts when a delaminating test is carried out.

Table 2

| Composition | | Impact strength DIN 53,453, 23° C. (cmkp/cm$^2$) | Flexural strength* ASTM D 790 23° C. (kp/cm$^2$) | Modulus of elasticity* ASTM D 790 23° C. (kp/cm$^2$) | Vicat softening point DIN 53,460 process B (5 kp) (° C.) |
|---|---|---|---|---|---|
| ASA | PETP | | | | |
| 87.5% by weight | 12.5% by weight | no break | 740 | 24,000 | 105 |
| 75.0% by weight | 25.0% by weight | no break | 740 | 25,000 | 107 |
| 50.0% by weight | 50.0% by weight | no break | 850 | 27,000 | 110 |
| 0.0% by weight | 100.0% by weight | no break | 1,180 | 33,000 | 175 |

*Samples heat-treated at 140° C. for 5 minutes.

EXAMPLE 3

Before processing, Luran S 757 R is mixed in a ratio of 3:1 with a polybutylene terephthalate in the form of granules (CRASTIN 2891 from CIBA-GEIGY AG). This granule mixture is extruded in an extruder installation having a screw diameter of 90 mm, at a material temperature of 255° C., to give a 100 μ thick sheet and the sheet is cooled on a cooling installation customary for thin sheets. The temperature of the first cooling roll is 70° C., that of the second cooling roll is 40° C. and that of the subsequent cooling roll is 20° C.

This sheet is then printed with printing inks based on a vinyl polymer and is lacquer-coated with polyurethane lacquers.

A chipboard coated with a sheet and having embossing of accurate contours is obtained in this way and the coating is distinguished, inter alia, by good toughness and good chemical stability.

EXAMPLE 4

White-coloured granules of ASA (Luran S 776 S from BASF AG) are mixed with granular PBT (CRASTIN XB 2891 from CIBA-GEIGY AG) in a ratio of 3:1 and the mixture is extruded in accordance with Example 3 to give a 300 μ thick sheet.

The temperature of the cooling roll is 130° C., so that the sheet passes at elevated temperature into the embossing installation which follows the cooling station and in which the embossing rolls are warmed to 150° C. The sheet is further cooled to room temperature in a conventional manner. This sheet is cut into narrow 18 mm strips and rolled up. The machines customarily used for providing edging profiles using sheets coated with hot-melt adhesive are employed for providing the cut edges of chipboards with edging profiles. The adhesive customarily used for this purpose is applied at 180° C. to the sheet and/or the edge and the bond with the edge is then produced in the conventional way. Under the conditions customary in practice, the structure of the cut surfaces does not come through and no change in the embossing is found when the strips described above are applied.

EXAMPLE 5

A combination extrusion installation which consists of a single-screw extruder of 90 mm diameter, a single-screw extruder of 45 mm diameter and also a two-layer die in which the two melts are combined immediately before the lip of the die, is used to produce the following composite sheet. A granule mixture corresponding to Example 3 is plasticised in the 90 mm extruder and PETP granules (CRASTIN 2813 from CIBA-GEIGY AG) are plasticised in the 45 mm extruder. The material temperature prior to entry into the particular die channels is 245° C. in the case of the ASA/PBT mixture and 270° C. in the case of the PETP. The thickness of the PETP layer is 20 μ and the layer thickness of the sheet made from the mixture is 100 μ. This laminate is cooled to 170° C. and embossed at an embossing roll temperature of 160° C.

Laminating is effected on a commercially available roller hot-laminating installation at a sheet temperature of about 100° C. and a roller temperature of 130° C. under customary pressure conditions. The adhesive mentioned in Example 3 is applied to the pre-warmed chipboard. Under these conditions the surface quality mentioned in Example 3 is again obtained.

EXAMPLE 6

A mixture of ASA (Luran S 757 R) and PETP (CRASTIN E 150) in a ratio of 1:1 is mixed in the installation described in Example 3 and extruded at a material temperature of 270° C. to give a 100 μ thick sheet. After the cooling station, this sheet passes at a temperature of 180° C. into the embossing installation and is embossed at an embossing roll temperature of 160° C. This embossed sheet is printed, dye is wiped into the pores and the sheet is lacquer-coated with PUR lacquer in accordance with Example 3. This sheet is processed as in Example 3 and the same good surface quality and embossing are obtained.

EXAMPLE 7

Properties of glass fibre-reinforced polymer mixtures of PBT + ASA.

The properties indicated are determined on standard bars produced, as in Example 1, from the compositions listed in Table 3.

Table 3

| Property | Composition<br>x % by weight of glass fibres<br>y % by weight of polybutylene terephthalate<br>z % by weight of Luran S 757 | | |
|---|---|---|---|
| | x = 30% by weight<br>y = 60% by weight<br>z = 10% by weight | x = 25% by weight<br>x = 50% by weight<br>z = 25% by weight | x = 20% by weight<br>y = 40% by weight<br>z = 40% by weight |
| Tensile strength (N/mm$^2$) DIN 53,455 | 121 | 102 | 900 |
| Elongation at break (%) DIN 53,455 | 2.1 | 1.8 | 1.8 |
| Flexural strength (N/mm$^2$) ASTM D 790 | 200 | 160 | 137 |
| Modulus of elasticity (N/mm$^2$) DIN 53,457 | 9,100 | 7,700 | 7,000 |
| Bending modulus (N/mm$^2$) ASTM D 790 | 8,200 | 6,900 | 5,900 |
| Impact strength (KJ/m$^2$) DIN 53,453 | 33.4 | 24.1 | 19.0 |
| Notched impact strength DIN 53,454 (KJ/m$^2$) | 7.5 | 5.9 | 5.1 |
| Heat distortion Process A resistance | 201 | 175 | 118 |
| ISO/R 75° C.  Process B | | 209 | 191 |
| Tracking resistance DIN 534,580 | 325 | 375 | 550 |

What is claimed is:

1. A thermoplastic molding composition which comprises:
   (a) from 95 to 5% by weight of components (a) plus (b) of a linear thermoplastic polyester or mixture of polyesters, having an intrinsic viscosity of at least 0.6 dl/g, measured on a solution of 1 gram of polyester in 100 ml of solvent consisting of equal parts of phenol and 1,1,2,2-tetrachloroethane, at 30° C., and
   (b) from 5 to 95% by weight of components (a) plus (b) of a copolymer of styrene and acrylonitrile with alpha-methylstyrene, an alkyl acrylate or mixture of alpha-methylstyrene and alkyl acrylate, said alkyl acrylate having alkyl of 1 to 6 carbon atoms, said copolymer (b) being from 10 to 85% by weight of (b) of styrene, from 5 to 40% by weight of (b) of acrylonitrile, and from 5 to 50% by weight of (b) of alpha-methylstyrene, an alkyl acrylate or mixture thereof.

2. A composition according to claim 1 wherein component (b) is a statistical copolymer.

3. A composition according to claim 1 wherein component (b) is a graft copolymer.

4. A composition according to claim 3 wherein component (b) is a graft copolymer of styrene and acrylonitrile on poly(alpha-methylstyrene) or a poly(alkyl acrylate) elastomer.

5. A composition according to claim 3 wherein component (b) is a graft copolymer of styrene and acrylonitrile on a poly(alkyl acrylate) elastomer.

6. A composition according to claim 1 wherein component (a) is from 90 to 10% by weight of (a) plus (b), and component (b) is from 10 to 90% by weight of (a) plus (b).

7. A composition according to claim 6 wherein component (a) is from 50 to 20% by weight of (a) plus (b), and component (b) is from 50 to 80% by weight of (a) plus (b).

8. A composition according to claim 1, wherein the polyester is crystalline or partially crystalline, or in the amorphous form has a glass transition temperature of at least 100° C.

9. A composition according to claim 1, wherein the intrinsic viscosity of the polyester is at least 0.8 dl/g.

10. A composition according to claim 1 wherein the polyester is derived from at least 30 mol % of aromatic dicarboxylic acids and from at least 30 mol % of aliphatic diols.

11. A composition according to claim 10 wherein the polyester is derived from at least 40 mol % of aromatic dicarboxylic acids and from at least 40 mol % aliphatic diols.

12. A composition according to claim 10 wherein the aromatic dicarboxylic acid is terephthalic acid, isophthalic acid or a mixture thereof; and the aliphatic diol is a linear alkylenediol having 2 to 6 carbon atoms.

13. A composition according to claim 12, wherein the polyester is polyethylene terephthalate or poly-1,4-butylene terephthalate.

14. A composition according to claim 1 wherein the component (b) copolymer is from 30 to 80% by weight of styrene, from 10 to 30% by weight of acrylonitrile, and from 10 to 40% by weight of alpha-methylstyrene, an alkyl acrylate or mixture thereof.

15. A composition according to claim 1 wherein the average molecular weight of the copolymer of component (b) is at least 10,000.

16. A composition according to claim 15 wherein the average molecule weight of the copolymer of component (b) is at least 50,000.

17. A composition according to claim 1 which additionally contains 5 to 60% by weight of the total composition of a reinforcing filler.

18. A composition according to claim 17 which contains 10 to 40% by weight of a filler.

19. A composition according to claim 17 wherein the filler is glass beads, glass fibers or a mixture thereof.

20. An injection or extrusion molding made from the composition according to claim 1.

21. A sheet or panel made from the composition according to claim 1.

22. A sheet or panel according to claim 21 which is embossed.

* * * * *